US009998271B2

(12) United States Patent
Ko et al.

(10) Patent No.: US 9,998,271 B2
(45) Date of Patent: Jun. 12, 2018

(54) METHOD AND APPARATUS FOR SELECTING MODULATION AND CODING SELECTION (MCS) LEVEL IN WIRELESS MOBILE COMMUNICATION SYSTEM

(71) Applicant: Samsung Electronics Co., Ltd., Gyeonggi-do (KR)

(72) Inventors: Yong-Chae Ko, Gyeonggi-do (KR); Byeong-Si Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 298 days.

(21) Appl. No.: 14/226,124

(22) Filed: Mar. 26, 2014

(65) Prior Publication Data
US 2014/0293899 A1 Oct. 2, 2014

(30) Foreign Application Priority Data
Mar. 26, 2013 (KR) ........................ 10-2013-0032027

(51) Int. Cl.
*H04L 12/701* (2013.01)
*H04W 4/02* (2018.01)
(Continued)

(52) U.S. Cl.
CPC .......... *H04L 5/0069* (2013.01); *H04L 1/0003* (2013.01); *H04L 1/0009* (2013.01); *H04L 1/0026* (2013.01); *H04L 1/1812* (2013.01)

(58) Field of Classification Search
CPC ....... H04L 1/003; H04L 1/009; H04L 1/0034; B62K 25/286; H04B 17/138; H04W 52/262; H04W 72/02; H04W 36/18; H04W 16/046
USPC .......... 455/63.1, 67.1, 442, 456.2, 507, 522, 455/524, 226; 280/281, 283, 284; 370/329, 332, 252, 259; 375/260, 227
See application file for complete search history.

(56) References Cited

U.S. PATENT DOCUMENTS

2006/0067256 A1 3/2006 Alazraki et al.
2007/0147331 A1 6/2007 Bi et al.
(Continued)

FOREIGN PATENT DOCUMENTS

EP 1 545 040 6/2005
KR 1020090057552 6/2009
(Continued)

OTHER PUBLICATIONS

European Search Report dated Nov. 20, 2017 issued in counterpart application No. 14161715.9-1875, 18 pages.

*Primary Examiner* — Alpus H Hsu
*Assistant Examiner* — Camquyen Thai
(74) *Attorney, Agent, or Firm* — The Farrell Law Firm, P.C.

(57) ABSTRACT

A method and apparatus for selecting a Modulation and Coding Selection (MCS) level by a base station in a wireless mobile communication system is provided. The method includes receiving channel condition information from a terminal; estimating a channel condition of the terminal based on the channel condition information; determining a location of the terminal based on the estimated channel condition of the terminal; measuring intensities of signals that are periodically received from the terminal; determining a moving direction and a moving velocity of the terminal based on the measured intensities; and selecting an MCS level that is to be allocated to the terminal based on the location, the moving direction, and the moving velocity of the terminal.

14 Claims, 6 Drawing Sheets

(51) Int. Cl.
*H04W 40/12* (2009.01)
*H04L 5/00* (2006.01)
*H04L 1/00* (2006.01)
*H04L 1/18* (2006.01)

(56) References Cited

U.S. PATENT DOCUMENTS

| | | | |
|---|---|---|---|
| 2008/0132173 A1 | 6/2008 | Sung et al. | |
| 2008/0303242 A1* | 12/2008 | O'Connor | B62K 25/286 |
| | | | 280/284 |
| 2009/0052512 A1* | 2/2009 | Kim | H04B 7/01 |
| | | | 375/227 |
| 2009/0081955 A1* | 3/2009 | Necker | H04W 16/04 |
| | | | 455/63.1 |
| 2009/0141673 A1 | 6/2009 | Hwang et al. | |
| 2009/0247186 A1* | 10/2009 | Ji | G01S 5/02 |
| | | | 455/456.1 |
| 2010/0003990 A1* | 1/2010 | Suemitsu | H04W 72/02 |
| | | | 455/442 |
| 2010/0014500 A1 | 1/2010 | Lee et al. | |
| 2010/0080176 A1* | 4/2010 | Maas | H04L 1/0034 |
| | | | 370/329 |
| 2010/0091725 A1 | 4/2010 | Ishii | |
| 2010/0093287 A1* | 4/2010 | Higuchi | H04L 1/0026 |
| | | | 455/67.13 |
| 2010/0120464 A1 | 5/2010 | Bjorken et al. | |
| 2010/0182973 A1 | 7/2010 | Kim et al. | |
| 2011/0096753 A1* | 4/2011 | Abdel-Kader | H04W 24/10 |
| | | | 370/332 |
| 2011/0201357 A1* | 8/2011 | Garrett | G01S 5/0252 |
| | | | 455/456.2 |
| 2012/0135778 A1* | 5/2012 | Tian | H04L 1/0003 |
| | | | 455/522 |
| 2012/0149416 A1* | 6/2012 | Nammi | H04B 7/063 |
| | | | 455/507 |
| 2012/0155314 A1* | 6/2012 | Miyata | H04W 72/048 |
| | | | 370/252 |

FOREIGN PATENT DOCUMENTS

| | | |
|---|---|---|
| KR | 1020090118075 | 11/2009 |
| KR | 1020100085805 | 7/2010 |

* cited by examiner

METHOD AND APPARATUS FOR SELECTING MODULATION AND CODING SELECTION (MCS) LEVEL IN WIRELESS MOBILE COMMUNICATION SYSTEM

PRIORITY

This application claims priority under 35 U.S.C. § 119(a) to a Korean patent application filed in the Korean Intellectual Property Office on Mar. 26, 2013 and assigned Serial No. 10-2013-0032027, the entire disclosure of which is incorporated herein by reference.

BACKGROUND OF THE INVENTION

1. Field of Invention

The present invention relates generally to a method and apparatus for selecting a Modulation and Coding Selection (MCS) level in a wireless mobile communication system.

2. Description of the Related Art

A typical broadband wireless mobile communication system uses Adaptive Modulation and Coding (AMC) in order to increase the data transmission efficiency of a wireless link and uses Outer Loop Rate Control (OLRC) in order to increase a Modulation order Product code Rate (MPR).

The AMC ensures high data transmission performance by differentiating modulation and coding methods according to a wireless channel condition and wireless channel fluctuation of a terminal. The AMC applies different modulation and coding methods between terminals in a short range from and terminals distant from a base station. The OLRC selects an MCS (also referred to as MPR) level for data to be transmitted, according to whether Hybrid Automatic Repeat reQuest (HARQ) information (that is, a HARQ ACK signal or a HARQ NACK signal) is received from a MAC terminal and reflects the selected MCS level to scheduling.

A terminal reports a downlink Channel Quality Indicator (CQI) and HARQ feedback (HARQ ACK or HARQ NACK) information to a base station at regular time intervals. Then, the base station selects an MCS level for a data block to be transmitted based on the received feedback information and reflects the selected MCS level to scheduling.

The base station transmits data with a higher MCS level as receiving a higher CQI from the terminal and with a lower MCS level as receiving a lower CQI from the terminal. Also, the base station increases or decreases an MPR in response to an HARQ ACK signal or an HARQ NACK signal. Generally, the base station increases an MPR if ACK signals are successively received one or more times and decreases an MPR if NACK signals are successively received one or more times. Increasing an MPR means increasing an MCS level, and decreasing an MPR means decreasing an MCS level.

However, if a change of an MCS level by MAC operation is different from a change in wireless environment that a terminal actually experiences, frequency band efficiency may be reduced. Accordingly, a method for overcoming the problem is needed.

Furthermore, in the OLRC, a range for MPR adjustment according to HARQ feedback is fixed, which disables adaptive operation according to a channel environment and a terminal's condition. If a narrow variable range of MPR is set, it is difficult to quickly respond when a terminal moves or an environment, such as a fading channel environment, in which channel fluctuation is significant. In contrast, if a wide variable range of MPR is set, frequency band use efficiency is reduced in a stable channel environment such as Additive white Gaussian Noise (AWGN), resulting in degradation of data transmission performance, although a quick response to an environment in which channel fluctuation is significant is possible.

The above information is presented as background information to assist with an understanding of the present invention. No determination has been made, and no assertion is made, as to whether any of the above might be applicable as prior art with regard to the present invention.

SUMMARY OF THE INVENTION

An aspect of the present invention addresses at least the above-mentioned problems and/or disadvantages and provides at least the advantages described below.

Accordingly, an aspect of the present invention provides a method and apparatus for selecting a Modulation and Coding Selection (MCS) level in a wireless mobile communication system.

Another aspect of the present invention is to provide a method and apparatus for adaptive MCS level selection to improve data transmission performance in a broadband wireless mobile communication system.

Another aspect of the present invention is to provide a method and apparatus for improving data transmission efficiency of a wireless link by adjusting a variable range of MCS adaptively according to a wireless channel condition of a terminal.

In accordance with an aspect of the present invention, a method for selecting a Modulation and Coding Selection (MCS) level by a base station in a wireless mobile communication system is provided. The method includes receiving channel condition information from a terminal; estimating a channel condition of the terminal based on the channel condition information; determining a location of the terminal based on the estimated channel condition of the terminal; measuring intensities of signals that are periodically received from the terminal; determining a moving direction and a moving velocity of the terminal based on the measured intensities; and selecting a MCS level that is to be allocated to the terminal, based on the location, the moving direction, and the moving velocity of the terminal.

In accordance with another aspect of the present invention, a method for selecting a Modulation and Coding Selection (MCS) level by a base station in a wireless mobile communication system is provided. The method includes measuring a time interval between data transmission times for a terminal; acquiring a Round Trip Time (RTT) value based the measured time interval; and selecting a MCS level that is to be allocated to the terminal based on the RTT value.

In accordance with another aspect of the present invention, a method for selecting a Modulation and Coding Selection (MCS) level by a base station in a wireless mobile communication system is provided. The method includes receiving, at a first time from a terminal, first channel condition information including at least one of first Channel Quality Information (CQI), first rank information, first information about an MCS level allocated to the terminal, and first Hybrid Automatic Repeat reQuest (HARQ) feedback information, from a terminal; receiving, at a second time after the first time from the terminal, second channel condition information including at least one of second CQI, second rank information, second information about a MCS level allocated to the terminal, and second HARQ feedback information; determining a changed amount of a channel condition of the terminal based on the first channel condition information and the second channel condition information;

and selecting an MCS level that is to be allocated to the terminal based on the changed amount of the channel condition of the terminal.

In accordance with another aspect of the present invention, a base station in a wireless mobile communication system is provided. The base station includes a receiver configured to receive channel condition information from a terminal; and a controller configured to estimate a channel condition of the terminal based on the channel condition information, to determine a location of the terminal based on the estimated channel condition of the terminal, to measure intensities of signals that are periodically received from the terminal, to determine a moving direction and a moving velocity of the terminal based on the measured intensities, and to select a Modulation and Coding Selection (MCS) level that is to be allocated to the terminal based on the location, the moving direction, and the moving velocity of the terminal.

In accordance with another aspect of the present invention, a base station in a wireless mobile communication system is provided. The base station includes a transmitter configured to transmit data to a terminal; and a controller configured to measure a time interval between data transmission times for the terminal, to acquire a Round Trip Time (RTT) value based on the measured time interval, and to select a Modulation and Coding Selection (MCS) level that is to be allocated to the terminal, based on the RTT value.

In accordance with another aspect of the present invention, a base station in a wireless mobile communication system is provided. The base station includes a receiver configured to receive, at a first time from a terminal, first channel condition information including at least one of first Channel Quality Information (CQI), first rank information, first information about a Modulation and Coding Selection (MCS) level allocated to the terminal, and first Hybrid Automatic Repeat reQuest (HARQ) feedback information, from a terminal, and to receive, at a second time after the first time from the terminal, second channel condition information including at least one of second CQI, second rank information, second information about an MCS level allocated to the terminal, and second HARQ feedback information; and a controller configured to determine a changed amount of a channel condition of the terminal, based on the first channel condition information and the second channel condition information, and to select an MCS level that is to be allocated to the terminal based on the changed amount of the channel condition of the terminal.

Other aspects, advantages, and salient features of the invention will become apparent to those skilled in the art from the following detailed description, which, taken in conjunction with the annexed drawings, discloses embodiments of the invention.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding but these are to be regarded as merely examples. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The present invention provides a method and apparatus for effectively selecting a Modulation and Coding Selection (MCS) level that is to be allocated to a terminal, thereby increasing data transmission efficiency. According to embodiments of the present invention, three MCS level selection methods are provided, the three MCS methods include: a method of selecting an MCS level according to a location and a moving pattern of a terminal; a method of selecting an MCS level according to a Round Trip Time (RTT) for data transmission; and a method of selecting an MCS level based on feedback information from a terminal. The MCS level selection methods will be described in detail, below.

1) First Embodiment: Method of Selecting an MCS Level According to a Location and a Moving Pattern of a Terminal FIG. 1 is a graph showing traffic transmission performance with respect to a location of a terminal, according to a first embodiment of the present invention.

Figure 1:
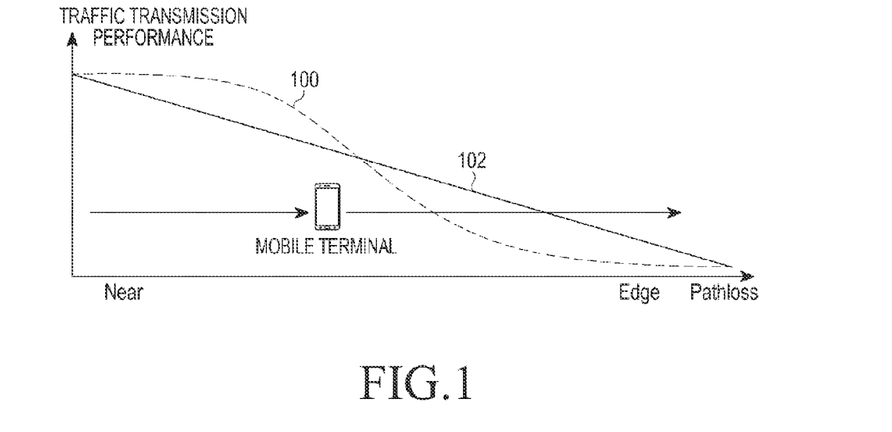
FIG. 1 is a graph showing traffic transmission performance with respect to a location of a terminal, according to a first embodiment of the present invention.

Referring to FIG. 1, traffic transmission performance of a terminal depends on a distance between the terminal and a base station. That is, if the terminal is nearest the base station, e.g., if the terminal is in the center of a cell, the traffic transmission performance of the terminal is highest, and if the terminal is most distant from the base station, e.g., if the terminal is in the edge of the cell, the traffic transmission performance of the terminal is lowest. That is, the traffic transmission performance of the terminal appears linearly depending on distances to the base station as shown by plot 102 of FIG. 1.

Figure 5:
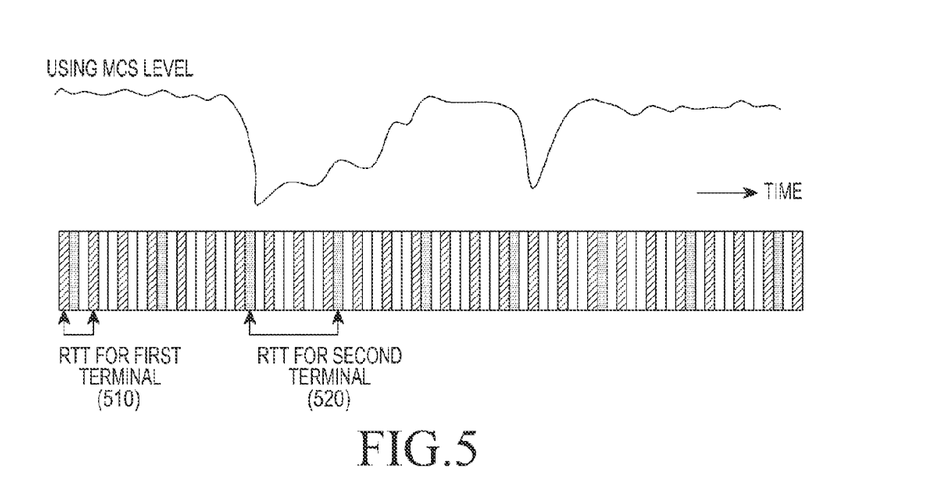
FIG. 5 is a plan view illustrating Round Trip Times (RTTs) for individual terminals, according to a second embodiment of the present invention.

However, in an actual wireless communication environment, the traffic transmission performance of the terminal appears non-linearly as shown by plot 100 of FIG. 1. Based on this property, a region (hereinafter, referred to as a field region) from the center of the cell to the edge of the cell can be divided into a plurality of regions, as shown in FIG. 5.

Figure 2:
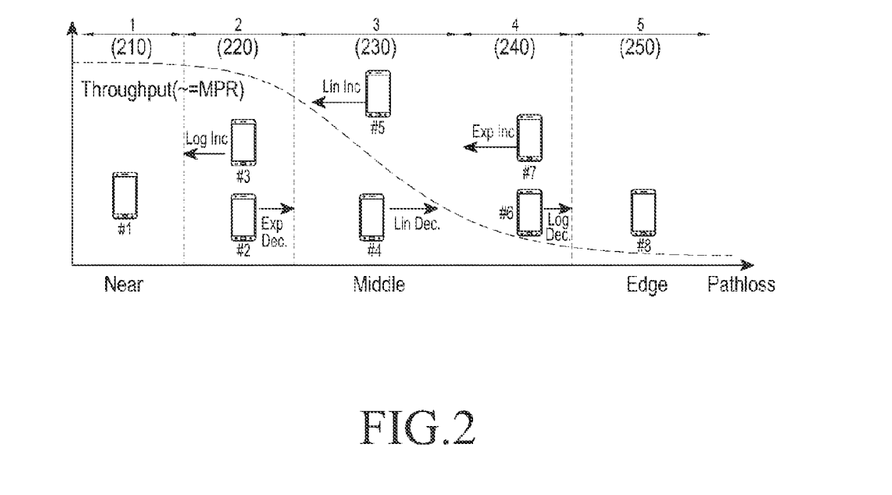
FIG. 2 is a graph illustrating a plurality of regions divided according to the traffic transmission performance, according to the first embodiment of the present invention.

FIG. 2 illustrates a plurality of regions divided according to the traffic transmission performance, according to the first embodiment of the present invention.

Referring to FIG. 2, the field region may be divided into 5 regions, and traffic transmission performance of the individual regions is shown in Table 1, below.

TABLE 1

| Field | Property |
|---|---|
| First Region(210) | Region to which a Highest MCS Level Is Allocated Region in which High Throughput Is Maintained |
| Second Region(220) | Traffic Transmission Performance of Terminal #2 Moving toward the Edge of Cell Exponentially Decreases Traffic Transmission Performance of Terminal #3 Moving toward the Center of Cell Exponentially Increases |
| Third Region(230) | Traffic Transmission Performance of Terminal #4 Moving toward the Edge of Cell Linearly Decreases Traffic Transmission Performance of Terminal #5 Moving toward the Center of Cell Linearly Increases |
| Fourth Region(240) | Traffic Transmission Performance of Terminal #6 Moving toward the Edge of Cell Logarithmically Decreases Traffic Transmission Performance of Terminal #7 Moving toward the Center of Cell Logarithmically Increases |
| Fifth Region(250) | Region to which Lowest MCS Level Is Allocated Region in which Low Throughput Is Maintained |

A base station estimates a channel condition of a terminal based on channel condition information (for example, Channel Quality Indicator (CQI)) that is periodically reported from the terminal and determines which region the terminal is located, based on the estimated channel condition of the terminal. At this time, the base station may accurately determine a location of the terminal by measuring intensities of sounding reference signals (SRSs) that are periodically transmitted from the terminal. Also, the base station may estimate a moving pattern (a moving direction and a moving velocity) of the terminal based on the intensities of the SRSs.

More specifically, the base station may determine a location of the terminal according to the intensities of the SRSs based on information shown in Table 2, below.

TABLE 2

| Intensity of SRS | Location of Terminal |
|---|---|
| First Threshold Value < Intensity of SRS | Location of Terminal Is in First Region (Center of Cell) (210) |
| Second Threshold Value < Intensity of SRS ≤ First Threshold Value | Location of Terminal Is in Second Region (220) |
| Third Threshold Value < Intensity of SRS ≤ Second Threshold Value | Location of Terminal Is in Third Region (230) |
| Fourth Threshold Value < Intensity of SRS ≤ Third Threshold Value | Location of Terminal Is in Fourth Region (240) |
| Intensity of SRS ≤ Fifth Threshold Value | Location of Terminal Is in Fifth Region (Edge of Cell) (250) |

Also, the base station may determine a moving direction of the terminal according to a change in intensity of the SRS based on information shown in Table 3, below.

TABLE 3

| Change in Intensity of SRS | Moving Direction of Terminal |
|---|---|
| Intensity of SRS Increases for a Predetermined Time Period | Terminal Moves From the Edge of Cell to the Center of Cell |
| Intensity of SRS Decreases for a Predetermined Time Period | Terminal Moves From the Center of Cell to the Edge of Cell |

Also, the base station may determine whether the moving velocity of the terminal increases or decreases, according to velocity at which the intensity of SRS increases or decreases, based on information shown in Table 4, below.

TABLE 4

| Velocity at which Intensity of SRS Increases or Decreases | Pattern in which Moving Velocity of Terminal Increases or Decreases |
|---|---|
| Velocity at which Intensity of SRS Increases or Decreases for a Predetermined Time Period Is Higher than Threshold Velocity | Moving Velocity of Terminal Increases |
| Velocity at which Intensity of SRS Increases or Decreases for a Predetermined Time Period Is Lower than Threshold Velocity | Moving Velocity of Terminal Decreases |

If the base station determines a location and a moving pattern of the terminal, based on information as shown in Tables 2, 3, and 4, the base station may select an MCS level corresponding to the terminal based on the location and the moving pattern of the terminal. In order to select an MCS level, an MCS level adjustment value may be used, and the MCS level adjustment value may include M_up which is a parameter for increasing the MCS level in order to increase a MPR, and M_down which is a parameter for decreasing the MCS level in order to decrease the MPR. An MCS level that is to be allocated to the terminal may be selected according to the location and the moving pattern of the terminal determined by the based station, for example, by one of methods as shown in Table 5, below.

TABLE 5

| Location and Moving Pattern of Terminal | Method of Selecting MCS Level |
|---|---|
| Terminal Is Located in First Region 210 | Setting M_up and M_down to Smallest Values to Select an MCS Level |
| Terminal Is Located in Second Region 220 | Setting M_up and M_down to Values Greater than those used in the First Region 210 to Select an MCS Level |

TABLE 5-continued

| Location and Moving Pattern of Terminal | Method of Selecting MCS Level |
| --- | --- |
| Terminal Is Located in Second Region (220) while Moving from the Center of Cell to the Edge of Cell | Select an MCS Level Based on Moving Velocity of Terminal Using an Exponential Function |
| Terminal Is Located in Second Region (220) while Moving from the Edge of Cell to the Center of Cell | Select an MCS Level Based on Moving Velocity of Terminal Using a Logarithmic Function |
| Terminal Is Located in Third Region (230) | Setting M_up and M_down to values greater than Those Used in Second Region 220 to Select an MCS Level |
| Terminal Is Located in Third Region (230) while Moving from the Center of Cell to the Edge of Cell | Select an MCS Level Based on Moving Velocity of Terminal Using a Linear Function |
| Terminal Is Located in Third Region 230 while Moving the Edge of Cell to the Center of Cell | Select an MCS Level Based on Moving Velocity of Terminal Using a Linear Function |
| Terminal Is Located in Fourth Region 240 | Setting M_up and M_down to Values Similar to Those Used in Second Region 220 to Select a MCS level |
| Terminal Is Located in Fourth Region 240 while Moving from the Center of Cell to the Edge of Cell | Selecting an MCS Level Based on Moving Velocity of Terminal Using a Logarithmic Function |
| Terminal Is Located in Fourth Region 240 while Moving from the Edge of Cell to the Center of Cell | Selecting an MCS Level Based on Moving Velocity of Terminal Using an Exponential Function |
| Terminal Is Located in Fifth Region 250 | Setting M_up and M_down to Smallest Values to Select an MCS Level |

The base station may set M_up and M_down to values corresponding to each region to determine a range of MCS levels that can be allocated to the terminal, and select, as an MCS level that is to be allocated to the terminal, an MCS level in the range of the MCS levels in consideration of the moving direction and the moving velocity of the terminal. As shown in Table 5, the base station may select an MCS level using a linear function, an exponential function, and/or a logarithmic function, which will be described below with reference to FIGS. 3A-3C.

Figure 3A:
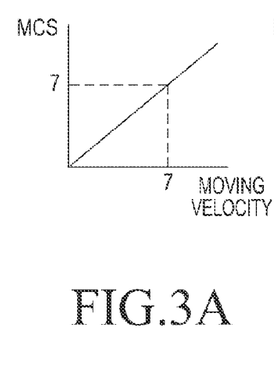
FIGS. 3A-3C are graphs showing MCS levels according to moving velocities of a terminal, according to the first embodiment of the present invention.
Figure 3B:
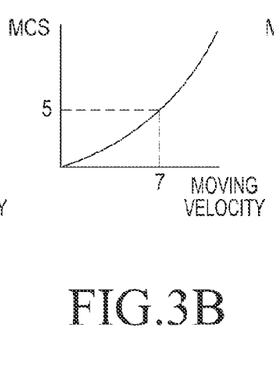
Figure 3C:
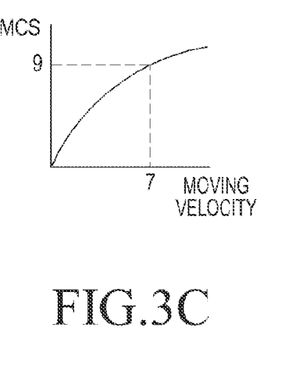

FIGS. 3A-3C are graphs showing MCS levels according to moving velocities of a terminal, according to the first embodiment of the present invention.

The linear function is a function of linearly increasing an MCS level to correspond to a moving velocity of the terminal, as shown in FIG. 3A. The exponential function is a function of exponentially increasing an MCS level to correspond to a moving velocity of the terminal, as shown in FIG. 3B. The logarithmic function is a function of logarithmically increasing an MCS level to correspond to a moving velocity of the terminal, as shown in FIG. 3C.

Figure 4:
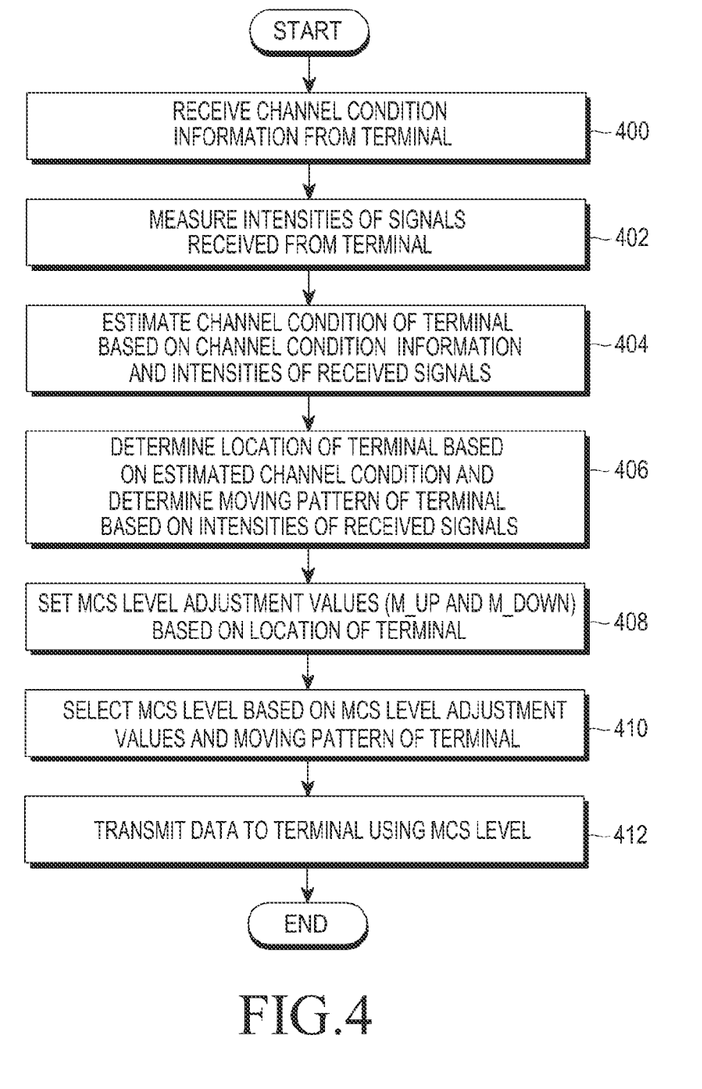
FIG. 4 is a flowchart illustrating a method in which a base station selects an MCS level and transmits data, according to the first embodiment of the present invention.

FIG. 4 is a flowchart illustrating a method in which a base station selects an MCS level and transmits data, according to the first embodiment of the present invention.

Referring to FIG. 4, the base station may receive channel condition information from a terminal, at operation 400. The channel condition information may include, for example, CQI, and may be periodically received by the base station. The base station may measure intensities of signals (for example, SRS signals that are periodically received from the terminal) received from the terminal, at operation 402. Then, the base station may estimate a channel condition of the terminal based on the channel condition information and the intensities of reception signals. The channel condition may be represented by a Signal to Interference-plus-Noise Ratio (SINR).

The base station may determine a location of the terminal based on the estimated channel condition and determine a moving pattern (that is, a moving direction and a moving velocity) of the terminal based on the intensities of reception signals, at operation 406. The location of the terminal may be a plurality of regions divided from the field region of the base station.

The base station may set MCS level adjustment values M_up and M_down based on the location of the terminal, at operation 408. The base station may select an MCS level based on the MCS level adjustment values and the moving pattern of the terminal, at operation 410. More specifically, the base station may determine a range of MCS levels that can be allocated to the terminal based on the MCS level adjustment values and select, as an MCS level that is to be allocated to the terminal, an MCS level among the MCS levels based on the moving direction and the moving velocity of the terminal. If an MCS level is selected, the base station may transmit data to the terminal using the MCS level, at operation 412.

If scheduling is performed based on an MCS level selected by estimating a location and a moving pattern of a terminal, according to the first embodiment of the present invention, traffic transmission performance may be improved according to the channel condition of the terminal, and the efficiency of wireless links may be improved. The first embodiment of the present invention relates to a case in which the field region is divided into 5 regions, however, the field region may be divided into 6 or more regions, or into 4 or less regions.

Also, the first embodiment of the present invention relates to a case in which the terminal is within a predetermined region, however, the location of the terminal can be estimated over the entire wireless communication region.

2) Second Embodiment: Method of Selecting an MCS Level According to RTT for Data Block Transmission of a Terminal A channel fluctuation characteristic detected by a terminal is different according to a traffic transmission pattern when a channel environment changes. Accordingly, the second embodiment of the present invention proposes a method of selecting an MCS level according to an RTT for data block transmission.

FIG. 5 is a view showing RTTs for individual terminals, according to a second embodiment of the present invention.

Referring to FIG. 5, a data block transmission RTT 510 for a first terminal is shorter than a data block transmission RTT 520 for a second terminal. A data block transmission pattern for each terminal is identical to an HARQ feedback reception pattern. Accordingly, the first terminal which has a shorter RTT 510 can receive more HARQ feedback signals than the second terminal, and the first terminal can have a higher frequency of MCS level adjustment than the second terminal. That is, an MCS level of the first terminal may change more often than an MCS level of the second terminal.

Accordingly, the first terminal can perform fast adaptation in response to channel fluctuation even in a narrow variable range of an MCS level and shows excellent performance in an environment where channel fluctuation is significant. Also, when a channel condition is stable, the first terminal may operate to increase frequency band efficiency since a variable range of an MCS level is narrow.

On the other hand, since the second terminal, which has an RTT 520 which is longer than that of the first terminal, has a lower reception frequency of HARQ feedback than the first terminal, the second terminal cannot perform fast adaptation in response to sharp fluctuation of a channel environment. In order to perform Adaptive Modulation and Coding (AMC) for fast adaptation, it is necessary to adjust a variable range of an MCS level by setting M_up and M_down to relatively high values. In consideration of this, the second embodiment of the present invention performs operation as follows.

The base station may update an RTT value for each terminal transmitting a data block. The RTT value for each terminal may be calculated using Equation (1), below.

$$RTT(n)=t\_n-t\_n-1 \quad (1)$$

In Equation (1), RTT(n) is an RTT value calculated when a $N^{th}$ data block is transmitted, t_n is a time at which the $N^{th}$ data block is transmitted, and t_n-1 is a time at which a $(N-1)^{th}$ data block is transmitted.

In order to prevent AMC performance from degrading due to changes of M_up and M-down values according to a momentary change of a data transmission pattern, the base station may Infinite Impulse Response (IIR) filter the RTT value (RTT(n)) using Equation (2), below.

$$RTT(current)=\{(K-1)*RTT(n-1)+RTT(n)\}/K \quad (2)$$

In Equation (2), RTT(current) represents a filtered RTT value, RTT(n-1) represents a RTT value calculate when the $(N-1)^{th}$ data block is transmitted, RTT(n) represents a RTT value calculated when the $N^{th}$ data block is transmitted, and K represents a filtering coefficient.

After the IIR filtered RTT value is acquired, the base station may M_up and M_down values corresponding to the RTT value shown in Table 6, below. The base station may determine a range of MCS levels that can be allocated to the terminal based on the M_up and M_down values, and select, as an MCS level that is to be allocated to the terminal, an MCS level in the range of the MCS levels.

TABLE 6

| RTT(current) | M_up | M_down |
|---|---|---|
| 0 < RTT ≤ 10 ms | 0.003 | 0.030 |
| 10 < RTT ≤ 20 ms | 0.004 | 0.040 |
| 20 < RTT ≤ 30 ms | 0.005 | 0.050 |
| 30 < RTT ≤ 40 ms | 0.006 | 0.060 |
| 40 < RTT ≤ 50 ms | 0.007 | 0.070 |
| 50 < RTT ≤ 60 ms | 0.008 | 0.080 |
| 60 < RTT ≤ 70 ms | 0.009 | 0.090 |
| 70 < RTT ≤ 80 ms | 0.010 | 0.100 |
| 80 < RTT ≤ 90 ms | 0.011 | 0.110 |
| 90 < RTT ≤ 100 ms | 0.012 | 0.120 |
| 100 < RTT | 0.013 | 0.130 |

As another method, the base station may calculate M_up and M_down values using the IIR filtered RTT value. To do this, the base station may use Equation (3), below.

$$M\_up=W*RTT(current)$$

$$M\_down=M\_up*(1-T\_BLER) \quad (3)$$

In Equation (3), W represents a weight value, and T_BLER represents a data block error rate. W and T_BLER may be set to fixed values.

After the M_up and M_down values are calculated, the base station may determine a range of MCS levels that can be allocated to the terminal based on the M_up and M_down values. The base station may select, as an MCS level that is to be allocated to the terminal, an MCS level in the range of the MCS levels.

Figure 6:
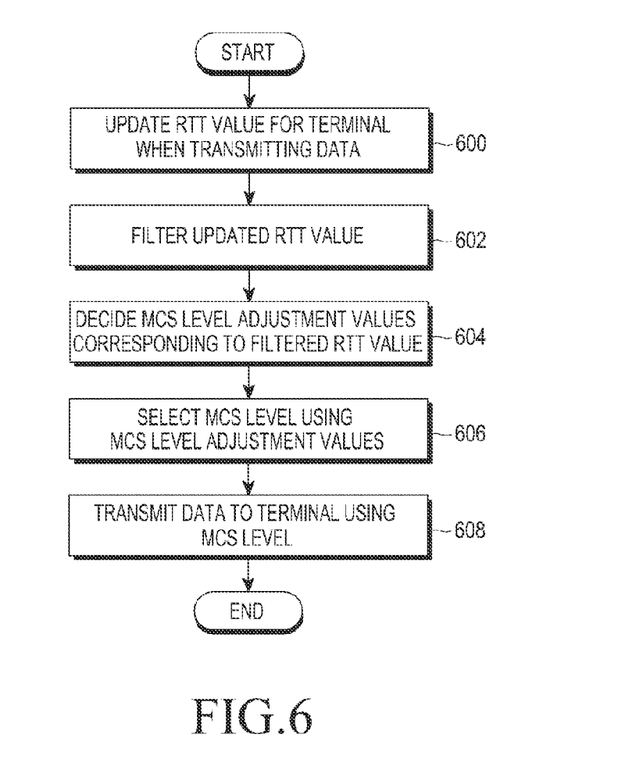
FIG. 6 is a flowchart illustrating a method in which a base station selects an MCS level, and transmits data, according to the second embodiment of the present invention.

FIG. 6 is a flowchart illustrating a method in which a base station selects an MCS level and transmits data, according to the second embodiment of the present invention.

Referring to FIG. 6, the base station may update an RTT value of a terminal when transmitting data, at operation 600. Then, the base station may filter the updated RTT value, at operation 602, and determine MCS level adjustment values corresponding to the filtered RTT value, at operation 604. The base station may select an MCS level using the MCS level adjustment values, at operation 606, and transmit data to the terminal using the MCS level, at operation 608.

3) Third Embodiment: Method of Selecting an MCS Level Based on Feedback Information from Terminal According to a third embodiment of the present invention, a method of estimating a change in channel environment based on feedback information received from each terminal and adjusting a variable range of MCS levels according to the result of the estimation to improve throughput is provided. That is, the third embodiment of the present invention proposes a method of quickly decreasing an MPR in an environment where the channel environment of a terminal deteriorates significantly so that an MCS level enabling successful transmission of data can be used and of quickly increasing an MPR when the channel environment of the terminal is improved so that an MCS level providing high frequency band efficiency can be used.

When a channel environment is stably maintained, setting a narrow variable range of MPR is advantageous in view of frequency band efficiency. If a wide variable range of MPR is set in a stable channel environment, an MPR is lowered when HARQ NACK is received, which results in a decrease of frequency band efficiency by the adjusted amount of MPR.

The terminal may transmit feedback information periodically to the base station. The feedback information may include, for example, an CQI, a Rank Indicator (RI), an HARQ feedback information (ACK, NACK), and MPR information. Since the CQI and RI values are determined based on channel quality measured by the terminal, changes of the CQI and RI values may directly reflect a change of a wireless environment in which the terminal is located. Since the HARQ feedback information and the MPR information include history about recently transmitted data, the HARQ feedback information and the MPR information may be used as main factors for selecting an MCS level for a data block to be next transmitted. Accordingly, in the third embodiment of the present invention, the CQI, CI, RI, HARQ feedback information, and MPR information are used for scheduling and for selecting an MCS level.

Operations of the base station according to the third embodiment of the present invention will be described in detail, below.

If feedback information, e.g., a CQI, a RI, HARQ feedback information, and MPR information is received from a terminal, the base station may perform the following operations based on the received feedback information.

First, the base station may estimate fluctuations of a wireless channel based on the CQI received from the terminal and represent the estimated fluctuation of the wireless channel as a constant. To do this, the base station may use Equation 4, below.

$$V\_CQI(i)=W\_CQI*[V\_CQI(i-1)+0.5*\{|CQI(i)-CQI(i-1)|-V\_CQI(i-1)\}] \quad (4)$$

In Equation (4), V_CQI represents a changed amount of the CQI of the terminal at an $i^{th}$ time, W_CQI which is a positive integer represents a CQI weight value, V_CQI(i-1) represents a changed amount of the CQI at an $(i-1)^{th}$ time, CQI(i) represents the CQI at the $i^{th}$ time, and CQI(i-1) represents the CQI at the $(i-1)^{th}$ time.

The base station may estimate fluctuation of the wireless channel based on the RI, and represents the estimated fluctuation of the wireless channel as a constant. To do this, the base station may use Equation (5), below.

$$V\_RI(i)=W\_RI*[STDEV(RI(i),RI(i-1),\ldots RI(i-9))] \quad (5)$$

In Equation (5), V_RI(i) represents a changed amount of the RI of the terminal at the $i^{th}$ time, wherein the changed amount of the RI reflects a correlation variation that the terminal experiences, W_RI which is a positive integer represents a RI weight value, V_RI(i-1) represents a changed amount of the RI of the terminal at the $(i-1)^{th}$ time, RI(i) represents the RI at the $i^{th}$ time, RI(i-1), . . . , RI(i-9) represent RIs from the $(i-1)^{th}$ time to an $(i-9)^{th}$ time, and STDEV represents a function for calculating standard deviation.

The base station may estimate fluctuation of the wireless channel, based on MPR (MCS level) information used when the base station transmits data to the terminal, and represent the fluctuation of the wireless channel as a constant, in order to determine small fluctuation of the wireless channel, which cannot be detected using the CQI and RI. To do this, the base station may use Equation (6), below.

$$V\_MPR(i)=W\_MPR*[V\_MPR(i-1)+0.5*\{|MPR(i)-MPR(i-1)|-V\_MPR(i-1)\}] \quad (6)$$

In Equation (6), V_MPR(i) represents a changed amount of an MPR of the terminal at the $i^{th}$ time, wherein the changed amount of the MPR reflects small channel fluctuation which the terminal experiences, W_MPR which is a positive integer represents a MPR weight value, V_MPR(i-1) represents a changed amount of an MPR of the terminal at the $(i-1)^{th}$ time, MPR(i) represents a MPR at the $i^{th}$ time, and MPR(i-1) represents a MPR value at the $(i-1)^{th}$ time.

Then, the base station may estimate fluctuation of the wireless channel based on the HARQ feedback information and represents the estimated fluctuation of the wireless channel as a constant based on the HARQ feedback information, using Equation 7.

$$V\_HARQ(i)=W\_HARQ*Function(Var\_HARQ(\ )) \quad (7)$$

In Equation (7), V_HARQ(i) represents a changed amount of an HARQ value of the terminal at the $i^{th}$ time, W_HARQ which is a positive integer represents an HARQ weight, and Function(VAR_HARQ( )) represents V_HARQ( ) that is acquired using Table 7, below.

Table 7 shows a method of deciding a ceiling and a bottom of an MPR according to a pattern of received HARQ ACK and NACK in a range set to determine a variation range of MPR, and a method of deciding a V_HARQ( ) value based on a difference between the ceiling and the bottom.

TABLE 7

```
float Var_HARQ( )
    float ceiling = 0 ;
    float bottom = 0 ;
    float p = 0;
        for (int j=0 ; j < T / DL_HARQ_RTT ; J++) {
        if (==ACK)
            p = p + (T_BLER/100) ;
            if (p > ceiling)
                ceiling = p ;
        else if (== NACK)
            p = p - (100-T_BLER)/100 ;
            if (p < bottom)
                bottom = p ;
        else
        if (bottom > 0)
            bottom = 0 ;
        }
    return (ceiling - (bottom)) ;
```

If the V_CQI(i), the V_RI(i), the V_MPR(i), and the V_HARQ(i) are determined, the base station may calculate a V(current) value using Equation (8), below.

$$V(current)=V\_CQI(current)+V\_RI(current)+V\_MPR(current)+V\_HARQ(current) \quad (8)$$

According to Equation (8), the V(current) value is determined by summing the V_CQI(i), the V_RI(i), the V_MPR(i), and the V_HARQ(i); however, a method of deciding a V(current) value is not limited to Equation (8).

After the V(current) value is determined, the base station may determine M_up, M_down, and M_limit based on Table 8, below. Then, the base station may determine an MCS level that is to be allocated to the terminal based on the M_up, M_down, and M_limit. The M_limit may represent a upper limit of an MCS level that can be used when HARQ ACK is received.

TABLE 8

| CQI range | V(current) | M_up | M_down | M_limit |
|---|---|---|---|---|
| 1~6 | V(current) <= 2 | 0.01 | 0.09 | 0.50 |
|  | 2 < V(current) <= 4 | 0.02 | 0.18 | 1.00 |
|  | 4 < V(current) <= 6 | 0.03 | 0.27 | 1.50 |
|  | 6 < V(current) <= 8 | 0.04 | 0.36 | 2.00 |
|  | 8 < V(current) <= 10 | 0.05 | 0.45 | 2.50 |
|  | 10 < V(current) | 0.06 | 0.54 | 3.00 |

TABLE 8-continued

| CQI range | V(current) | M_up | M_down | M_limit |
|---|---|---|---|---|
| 7~9 | V(current) <= 2 | 0.03 | 0.27 | 1.50 |
| | 2 < V(current) <= 4 | 0.04 | 0.36 | 2.00 |
| | 4 < V(current) <= 6 | 0.05 | 0.45 | 2.50 |
| | 6 < V(current) <= 8 | 0.06 | 0.54 | 3.00 |
| | 8 < V(current) <= 10 | 0.07 | 0.63 | 3.50 |
| | 10 < V(current) | 0.08 | 0.72 | 4.00 |
| 10~15 | V(current) <= 2 | 0.05 | 0.45 | 2.50 |
| | 2 < V(current) <= 4 | 0.06 | 0.54 | 3.00 |
| | 4 < V(current) <= 6 | 0.07 | 0.63 | 3.50 |
| | 6 < V(current) <= 8 | 0.08 | 0.72 | 4.00 |
| | 8 < V(current) <= 10 | 0.09 | 0.81 | 4.50 |
| | 10 < V(current) | 0.10 | 0.90 | 5.00 |

Figure 7:
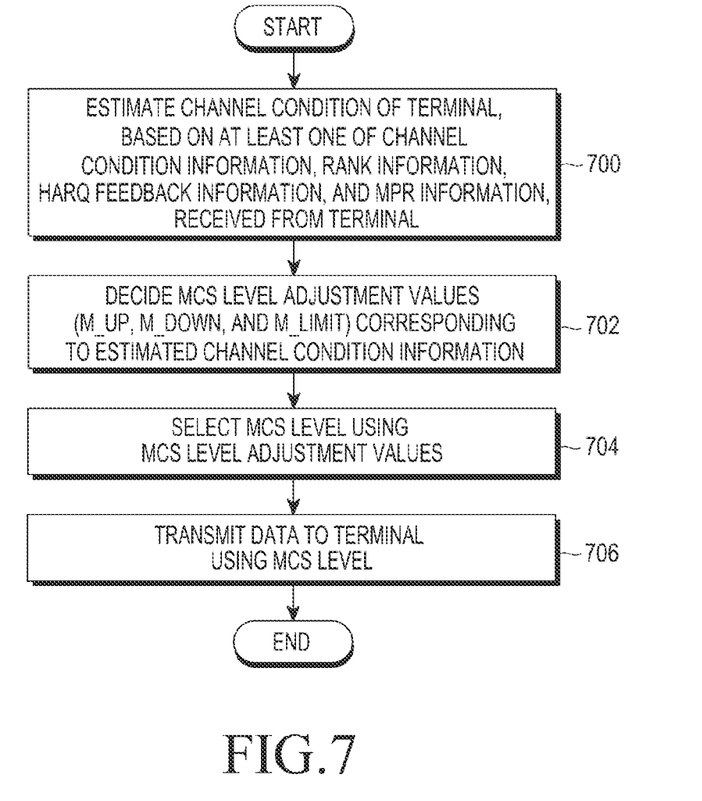
FIG. 7 is a flowchart illustrating a method in which a base station selects an MCS level and transmits data, according to a third embodiment of the present invention.

FIG. 7 is a flowchart illustrating the method in which a base station selects an MCS level and transmits data, according to the third embodiment of the present invention.

Referring to FIG. 7, the base station may estimate a channel condition of a terminal based on channel condition information (for example, CQI), rank information (for example, RI), HARQ feedback information, and MPR information from the terminal, at operation 700. Then, the base station may determine MCS level adjustment values, that is, M_up, M_down, and M_limit, corresponding to the estimated channel condition, at operation 702.

Thereafter, the base station may select an MCS level using the MCS level adjustment values, at operation 704, and transmit data to the terminal using the MCS level, in operation 706.

Figure 8:
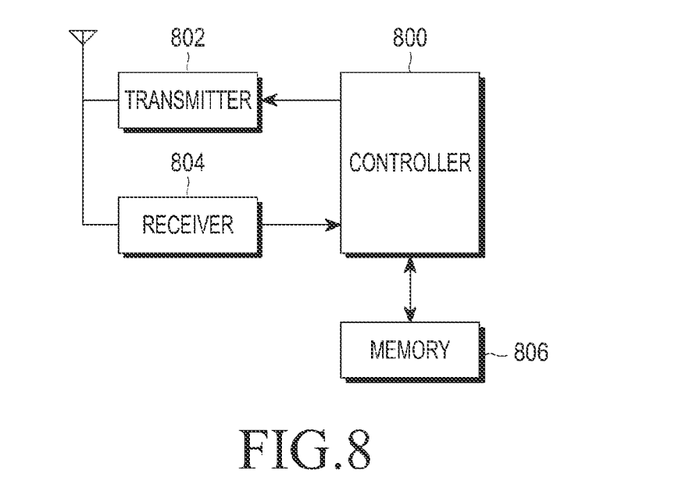
FIG. 8 is a block diagram illustrating a configuration of a base station according to an embodiment of the present invention.

FIG. 8 is a block diagram illustrating a configuration of a base station according to an embodiment of the present invention.

Referring to FIG. 8, the base station may include a controller 800, a transmitter 802, a receiver 804, and a memory 806.

The controller 800 may control the transmitter 802, the receiver 804, and the memory 806, and the controller may control overall operations of the base station. More specifically, the controller 800 may select an MCS level for each terminal according to the first through third embodiments of the present invention, and the controller may perform scheduling for allocating the MCS level to the terminal. Also, the controller 800 may transmit data to the terminal using the MCS level according to the results of the scheduling.

The transmitter 802 and the receiver 804 are used to communicate with terminals and perform operations related to data transmission and reception. The memory 806 is used to store various information generated according to operations of the base station. For example, the memory 806 may store feedback information received from each terminal and information about the results of the scheduling.

Figure 9:
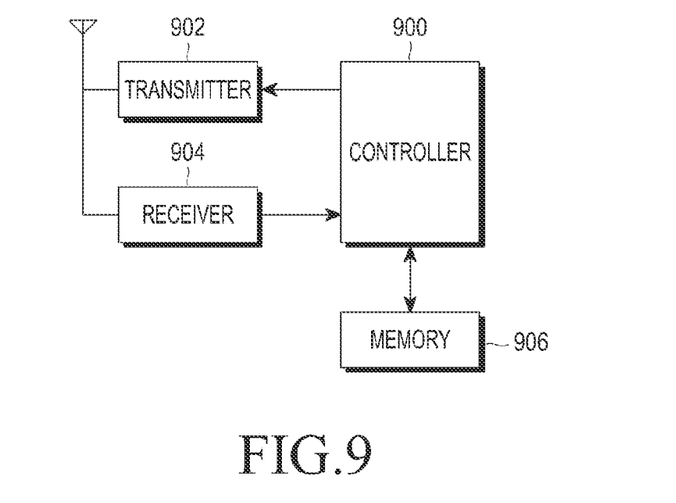
FIG. 9 is a block diagram illustrating a configuration of a terminal according to an embodiment of the present invention.

FIG. 9 is a block diagram illustrating a configuration of a terminal according to an embodiment of the present invention.

Referring to FIG. 9, the terminal may include a controller 900, a transmitter 902, a receiver 904, and a memory 906.

The controller 900 may control the transmitter 902, the receiver 904, and the memory 906, and the controller may control overall operations of the terminal. More specifically, the controller 900 may transmit information needed for selecting an MCS level to the base station, according to the first through third embodiments of the present invention.

The transmitter 902 and the receiver 904 are used to communicate with the base station. For example, the transmitter 902 may transmit channel condition information, SRS, and other feedback information to the base station, and the receiver 904 may receive data from the base station. The memory 906 may store various information generated according to operations of the terminal.

Therefore, according to embodiments of the present invention, by allocating an MCS level in consideration of a location, a moving direction, and a moving velocity of a terminal, data transmission/reception may be efficiently performed according to a wireless channel condition of the terminal. Also, data transmission efficiency may increase when a wireless channel environment of a terminal changes significantly.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for determining a modulation and coding selection (MCS) level by a base station in a wireless mobile communication system, the method comprising:
    estimating, by the base station, a channel condition of a terminal based on channel condition information received from the terminal;
    identifying, by the base station, a location of the terminal based on the estimated channel condition of the terminal;
    measuring, by the base station, intensities of signals that are periodically received from the terminal;
    identifying, by the base station, a moving direction and a moving velocity of the terminal based on the measured intensities;
    determining an MCS level increase value that is used to increase a predetermined MCS level and an MCS level decrease value that is used to decrease the predetermined MCS level based on the location of the terminal;
    generating a first MCS level by adding the MCS level increase value to the predetermined MCS level, and generating a second MCS level by subtracting the MCS level decrease value from the predetermined MCS level; and
    selecting an MCS level among MCS levels between the first MCS level and the second MCS level, as the MCS level that is to be allocated to the terminal, based on the moving direction and the moving velocity of the terminal.

2. The method of claim 1, wherein identifying the location of the terminal comprises:
    identifying, as a region in which the terminal is located, a region corresponding to the estimated channel condition of the terminal from among a plurality of regions obtained by dividing a field region from a cell center of the base station to a cell edge of the base station.

3. The method of claim 2, wherein the plurality of regions include a first region in which throughput of the terminal, linearly increases or decreases, a second region in which the throughput of the terminal exponentially increases or decreases, a third region in which the throughput of the terminal logarithmically increases or decreases, a fourth region in which the throughput of the terminal is the highest, and a fifth region in which the throughput of the terminal is the lowest.

4. The method of claim 1, wherein the location of the terminal is included in one among a plurality of regions in a cell of the base station.

5. A base station in a wireless mobile communication system, the base station comprising:
- a receiver configured to receive channel condition information from a terminal; and
- a controller configured to estimate a channel condition of the terminal based on the channel condition information, to identify a location of the terminal based on the estimated channel condition of the terminal, to measure intensities of signals that are periodically received from the terminal, to identify a moving direction and a moving velocity of the terminal based on the measured intensities, to determine an MCS level increase value that is used to increase a predetermined MCS level and an MCS level decrease value that is used to decrease the predetermined MCS level based on the location of the terminal, to generate a first MCS level by adding the MCS level increase value to the predetermined MCS level and to generate a second MCS level by subtracting the MCS level decrease value from the predetermined MCS level, and to select an MCS level among MCS levels between the first MCS level and the second MCS level, as the MCS level that is to be allocated to the terminal based on the moving direction and the moving velocity of the terminal.

6. The base station of claim 5, wherein the controller is configured to identify, as a region in which the terminal is located, a region corresponding to the estimated channel condition of the terminal from among a plurality of regions obtained by dividing a field region from a cell center of the base station to a cell edge of the base station.

7. The base station of claim 6, wherein the plurality of regions include a first region in which throughput of the terminal, linearly increases or decreases, a second region in which the throughput of the terminal exponentially increases or decreases, and a third region in which the throughput of the terminal logarithmically increases or decreases, a fourth region in which the throughput of the terminal is the highest and a fifth region in which the throughput of the terminal is the lowest.

8. The base station of claim 5, wherein the location of the terminal is included in one among a plurality of regions in a cell of the base station.

9. A method for receiving information about a modulation and coding selection (MCS) level by a terminal in a wireless mobile communication system, the method comprising:
- measuring a channel condition of the terminal;
- transmitting, to a base station, channel condition information based on the measured channel condition;
- periodically transmitting signals to the base station; and
- receiving, from the base station, information about a modulation and coding selection (MCS) level,
- wherein the channel condition information is used for identifying a location of the terminal by the base station, and intensities of the periodically transmitted signals are used for identifying a moving direction and a moving velocity of the terminal by the base station, and
- wherein the MCS level is determined by determining an MCS level increase value that is used to increase a predetermined MCS level and an MCS level decrease value that is used to decrease the predetermined MCS level based on the location of the terminal, generating a first MCS level by adding the MCS level increase value to the predetermined MCS level, generating a second MCS level by subtracting the MCS level decrease value from the predetermined MCS level, and selecting an MCS level among MCS levels between the first MCS level and the second MCS level, as the MCS level that is to be allocated to the terminal, based on the moving direction and the moving velocity of the terminal.

10. The method of claim 9, wherein the location of the terminal is included in a region corresponding to the channel condition of the terminal from among a plurality of regions obtained by dividing a field region from a cell center of the base station to a cell edge of the base station.

11. The method of claim 9, wherein the location of the terminal is included in one among a plurality of regions in a cell of the base station.

12. A terminal in a wireless mobile communication system, comprising:
- a controller configured to measure a channel condition of the terminal;
- a transmitter configured to transmit, to a base station, channel condition information based on the measured channel condition, and periodically transmitting signals to the base station; and
- a receiver configured to receive, from the base station, information about a modulation and coding selection (MCS) level,
- wherein the channel condition information is used for identifying a location of the terminal by the base station, and intensities of the periodically transmitted signals are used for identifying a moving direction and a moving velocity of the terminal by the base station, and
- wherein the MCS level is determined by determining an MCS level increase value that is used to increase a predetermined MCS level and an MCS level decrease value that is used to decrease the predetermined MCS level based on the location of the terminal, generating a first MCS level by adding the MCS level increase value to the predetermined MCS level, generating a second MCS level by subtracting the MCS level decrease value from the predetermined MCS level, and selecting an MCS level among MCS levels between the first MCS level and the second MCS level, as the MCS level that is to be allocated to the terminal, based on the moving direction and the moving velocity of the terminal.

13. The terminal of claim 12, wherein the location of the terminal is included in a region corresponding to the channel condition of the terminal from among a plurality of regions obtained by dividing a field region from a cell center of the base station to a cell edge of the base station.

14. The terminal of claim 12, wherein the location of the terminal is included in one among a plurality of regions in a cell of the base station.

* * * * *